Figure 1:
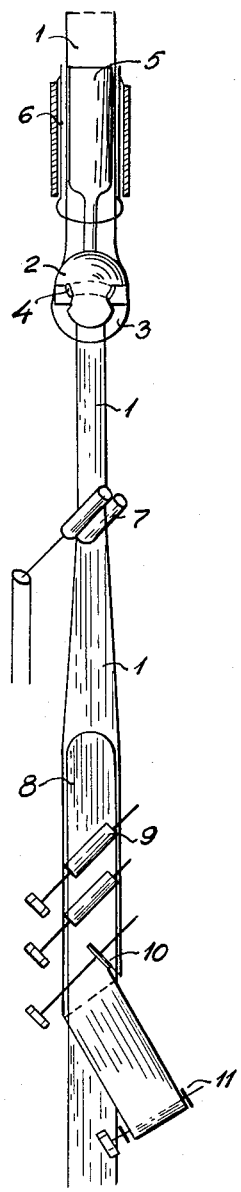

July 5, 1960  OLE-BENDT RASMUSSEN  2,943,356
METHOD OF MANUFACTURING A THIN BAND OF A HIGH MOLECULAR
SUBSTANCE WHICH IS AXIALLY ORIENTATED IN ANOTHER
DIRECTION THAN THE LENGTH DIRECTION
Filed Sept. 30, 1955

Ole-Bendt Rasmussen

United States Patent Office 2,943,356
Patented July 5, 1960

2,943,356

METHOD OF MANUFACTURING A THIN BAND OF A HIGH MOLECULAR SUBSTANCE WHICH IS AXIALLY ORIENTATED IN ANOTHER DIRECTION THAN THE LENGTH DIRECTION

Ole-Bendt Rasmussen, P.O. Box 11, Klampenborg, Copenhagen, Denmark

Filed Sept. 30, 1955, Ser. No. 537,627

6 Claims. (Cl. 18—47.5)

The present invention relates to a new continuous method of producing obliquely orientated bands of thermoplastic material. It is specially advantageous when a high degree of orientation is required, as for instance in the production of strong sheets and plates consisting of orientated plastic films or foils, which are cross-laminated.

There exist already several methods of stretching bands of high molecular substances in an oblique direction. Generally two sets of grips are used to draw the band in the desired direction. This does, however, lead to irregular structure. I have found that it is impossible to cold-draw foils for cross-laminates by such methods, because the resulting orientated bands are not levelled enough to fit together. Furthermore one has to cut off the edges of the band, where the grips have worked.

Other well-known methods avoid the use of grips and instead adapt special arrangements of rollers or the like. These methods are not good either, when the degree of orientation must be high, because the band will break during the stretching, if there are even minor ruptures in the edges.

By using the present invention it is possible to produce an obliquely orientated band of a high degree of orientation with a hitherto unknown regularity, and any trouble arising during the stretching from ruptures in an edge is eliminated. Furthermore very simple apparatus may be used for carrying out the invention.

According to the present invention one produces the obliquely orientated band from a tubular film or foil of the high molecular substance. This tube is orientated by stretching, and then cut up into one or several bands. The cut must not follow the orientation, but form an angle to this to yield the desired angle between the edge and the orientation. In this way one can produce bands of any orientational angle from above 0° to 90° included.

The tubular film or foil is preferably moulded by extrusion, and may be blown. In some cases the high molecular substance ought to be melted, semimelted or brought to the form of a viscous solution during the process of orientating it strongly. In such cases it is of course preferable to stretch the tube just after it has been formed, while it is leaving the nozzle of the extruder. When the stretching is carried out cold or in the thermoelastic state, the stretching process ought to be separate from the extrusion.

In one embodiment of the invention the tubular film or foil is stretched in the length direction and then cut up along a spiral (or along several parallel spirals). This method is preferred in most cases when the angle between the orientation and the length direction is to be lower than about 60-70°. Lateral orientation can of course not be directly obtained in this way. However, one can in some cases manufacture a laterally orientated band from a 60° orientated one produced in the described way, because the direction of orientation can often be turned by a suitable shearing action.

In another embodiment of the invention the tubular film or foil is turned at the same time as it is stretched lengthwise, or after having been stretched lengthwise. The purpose of this is to give the tube a spiral orientation. Finally it is cut up longitudinally or spirally. (The spiral or the spirals must not follow the orientation.) This method is preferred to produce bands of 90° orientation or of an orientation near to 90°.

In any case it is preferable to stretch the tubular film or foil over a mandrel. The use of a mandrel inside the tube is also important when the tube is cold-drawn. It is well-known that the orientating flow in a band or tube which is cold-drawn occurs substantially within a very restricted zone. In this zone the width and the thickness contract suddenly (the so-named "shoulder-effect"). The sudden width-contraction usually produces irregularities of the tension in the zone of flow, and this leads to an irregularly orientated and wrinkled band. I have found that a mandrel forces the orientating flow to occupy a much larger zone, and hence practically eliminates the irregularities and the wrinkles. When the tube to be stretched is in the thermoelastic state, the use of a mandrel has proved to have some importance for the regularity of the band. Furthermore it does of course avoid a sealing of the thermoelastic, self-adhesive tube.

Further details as well as apparatus for carrying out the invention appear from the drawings, which are rough diagrams of two sets of apparatuses producing bands of oblique orientation. Fig. 1 shows the production of 45° orientated bands, and Fig. 2 the production of laterally orientated bands. All apparatuses, except the cutting unit, are shown in perspective and in sectional view. The cutting apparatus is seen from above.

In Fig. 1 the tube 1 is stretched in a drawing-die unit consisting of a spherical steel mandrel 2 inside the tube 1, a die 3 with a soft coating 4 (for instance an exchangeable, thin rubber tube), a steel-rod 5 which is attracted electromagnetically by the solenoid 6, and which serves to press the mandrel 2 against the die 3. The current through the solenoid 6 can eventually be regulated by automatic control. The stress in the orientated tube 1 leaving the die 3 may for instance be registrated and fed back to control the current.

In connection with the drawing-die unit heating elements, devices for blowing steam or hot air on the tube, softening baths, and the like may be arranged.

The tube 1 is drawn through the die unit by means of a pair of rollers 7. The direction of orientation is indicated by the arrow 15. It continues to a cutting unit. This comprises a flat mandrel 8 with a very smooth surface, two leading rollers 9 and a rotating knife 10. The axes of the rollers 9 and the knife 10 are parallel and form angles of 45° to the tube-axis and the mandrel. When the material leaves the knife it has been cut into a 45° orientated band. This is wound on the winder 11 which is placed so that the band is drawn away from the knife under a certain angle, for instance of about 10°. This facilitates the cutting.

To prevent the twisting of the tubular foil between the pair of rollers 7 and the cutting unit, the latter, together with the winder 11 rotates at the speed necessary to counteract the twisting. The device for this rotation is not described. The cutting unit and the winder 11 may be fixed, and instead of these, the drawing unit, comprising the rollers 7 and the winder (not described) from which the unstretched tube is taken, may rotate.

Figure 2:
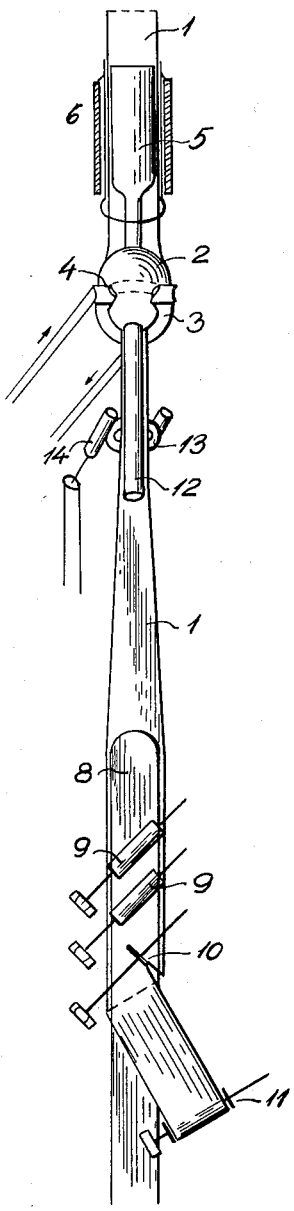

In Fig. 2 the die 3 is rotating. The direction of the rotation is indicated by arrows. The pair of rollers 7 are substituted by a special drawing equipment destined for oblique stress. Such an equipment may, as shown here, consist of a supporting mandrel 12 with a very smooth surface, fixed to the spherical mandrel 2, and a ring-formed roller 13, driven by a circle of ordinary rollers 14 (only 2 of these are shown). The ring-formed roller 13 consists preferably of rubber on a steel-wire skeleton. The rotation of the die 3 and the roller 13 are related to each other in such a way that the tube 1 becomes a 45° orientation. The cutting unit is exactly similar to that shown in Fig. 1, and as this cuts the tube after a 45° spiral, which is plane symmetrical to one of the spirals following the orientation, the resulting band will be 90° orientated. The drawing unit shown on Fig. 2 can also be used for turning longitudinal orientation of a tube formed foil to helical orientation, or for altering the angle of helical orientation.

In both processes shown on the drawings the tube is drawn over a mandrel inside the tube. Although this method of orientating is preferred, one can also, according to the invention, dispense with the use of a mandrel, and even orientate the tube by compressive stretching instead of drawing, or by a combination of both. The apparatus for cutting the orientated tube, which is shown on the drawings, is merely meant to be an example, and many other methods may be used just as well.

It has already been mentioned that the invention is specially advantageous in the production of crosslaminates of orientated plastic films or foils. Other important applications are the production of birefringent bands for polarizing filters, and of bands to be split up into an orientated and interconnected fiberwork, for use as yarns or in unwoven textiles.

What I claim is:

1. Method of manufacturing a thin continuous band consisting of thermoplastic material, which is uniaxially orientated in a direction that forms an angle to the longitudinal direction of the band, said method comprising the steps of giving a tubular foil a strong longitudinal orientation, and subsequently cutting said orientated tube to band form along substantially helical lines.

2. Method of manufacturing a thin continuous band consisting of thermoplastic material, which is uniaxially orientated in a direction that forms an angle to the longitudinal direction of the band, said method comprising the steps of giving a tubular foil a strong longitudinal orientation by cold drawing over a mandrel which is placed inside said tube and subsequently cutting said orientated tube to band form along substantially helical lines.

3. Method of manufacturing a thin continuous band consisting of thermoplastic material, which is uniaxially orientated in a direction that forms an angle to the longitudinal direction of the band, said method comprising the steps of giving a tubular foil a strong uniaxial, helical orientation by helical stretching and subsequently cutting said tube helically, the cut forming an angle to the direction of orientation.

4. Method according to claim 3, said angle being 90°.

5. Method of manufacturing a thin continuous band consisting of thermoplastic material, which is uniaxially orientated in a direction that forms an angle to the longitudinal direction of the band, said method comprising the steps of giving a tubular foil a strong longitudinal orientation, subsequently turning this into a helical orientation by continuous turning of the said orientated tube-formed foil and finally cutting said tube helically, the cut forming an angle to the direction of orientation.

6. Method according to claim 5, said angle being 90°.

References Cited in the file of this patent

UNITED STATES PATENTS

| | | |
|---|---|---|
| 1,607,623 | Higgins | Nov. 23, 1926 |
| 1,979,762 | O'Kane et al. | Nov. 6, 1934 |
| 1,988,787 | Fowler | Jan. 22, 1935 |
| 2,183,691 | Owens | Dec. 19, 1939 |
| 2,291,238 | Kimmick | July 28, 1942 |
| 2,347,036 | Dumont | Apr. 18, 1944 |
| 2,418,974 | Henry | Apr. 15, 1947 |
| 2,448,433 | Iron et al. | Aug. 31, 1948 |
| 2,505,146 | Ryan | Apr. 25, 1950 |
| 2,767,427 | Covington et al. | Oct. 23, 1956 |
| 2,773,285 | Piazze et al. | Dec. 11, 1956 |